(12) United States Patent
Lin (10) Patent No.: US 9,913,496 B2
(45) Date of Patent: Mar. 13, 2018

(54) VAPORIZER DEVICE OF COTTON-FREE ELECTRONIC CIGARETTE

(71) Applicant: Guangrong Lin, Guangdong (CN)

(72) Inventor: Guangrong Lin, Guangdong (CN)

( * ) Notice: Subject to any disclaimer, the term of this patent is extended or adjusted under 35 U.S.C. 154(b) by 43 days.

(21) Appl. No.: 15/037,678

(22) PCT Filed: May 26, 2014

(86) PCT No.: PCT/CN2014/078420
§ 371 (c)(1),
(2) Date: May 18, 2016

(87) PCT Pub. No.: WO2015/081670
PCT Pub. Date: Jun. 11, 2015

(65) Prior Publication Data
US 2016/0286863 A1   Oct. 6, 2016

(30) Foreign Application Priority Data
Dec. 4, 2013   (CN) .......................... 2013 1 0640599

(51) Int. Cl.
*A24F 47/00* (2006.01)
*A24D 3/16* (2006.01)
*F16B 7/04* (2006.01)

(52) U.S. Cl.
CPC .............. *A24F 47/008* (2013.01); *A24D 3/16* (2013.01); *F16B 7/042* (2013.01)

(58) Field of Classification Search
CPC ..... A24F 47/008; A61M 15/06; A61M 11/42; A61M 2205/3653; A61M 2205/8206
(Continued)

(56) References Cited

U.S. PATENT DOCUMENTS

| 8,899,240 B2 * | 12/2014 | Mass ..................... | A61M 15/06 |
| | | | 131/194 |
| 2007/0267031 A1 * | 11/2007 | Hon ...................... | A24F 47/008 |
| | | | 131/273 |

(Continued)

FOREIGN PATENT DOCUMENTS

| CN | 202618275 U | 12/2012 |
| CN | 103263085 A | 8/2013 |

(Continued)

OTHER PUBLICATIONS

International Search Report of PCT Patent Application No. PCT/CN2014/078420 dated Sep. 9, 2014.

*Primary Examiner* — Harshad C Patel (57) ABSTRACT

A vaporizer device of cotton-free e-cigarette, comprising: an outer sleeve, a supporting frame arranged inside the outer sleeve, a vaporizer unit fixed into the supporting frame, a filter piece and a liquid percolation piece sequentially connected to one end of the supporting frame, and a fixation seat connected to other end of the supporting frame. A backflow groove is made inside the supporting frame to prevent leakage caused by the backflow of residual liquid. The filter piece is made of heat-resisting material. The liquid percolation piece is connected at one end with a liquid storage cup by snap joints. Another end of the filter piece keeps a safe distance away from the vaporizer unit to avoid being burned. The liquid storage cup and the outer sleeve are assembled to form a slit therebetween to prevent the backflow of residual liquid.

6 Claims, 8 Drawing Sheets

(58) Field of Classification Search
USPC .................................................. 131/329, 328
See application file for complete search history.

(56) References Cited

U.S. PATENT DOCUMENTS

| | | | | |
|---|---|---|---|---|
| 2010/0200008 A1* | 8/2010 | Taieb | ..................... | A24F 47/008 |
| | | | | 131/360 |
| 2011/0011396 A1* | 1/2011 | Fang | ..................... | A24F 47/008 |
| | | | | 128/202.21 |
| 2013/0192618 A1* | 8/2013 | Li | ......................... | A24F 47/008 |
| | | | | 131/329 |
| 2013/0199528 A1* | 8/2013 | Goodman | ............... | F22B 1/282 |
| | | | | 128/203.26 |
| 2014/0196734 A1* | 7/2014 | Liu | ....................... | A24F 47/008 |
| | | | | 131/329 |

FOREIGN PATENT DOCUMENTS

| | | | |
|---|---|---|---|
| CN | 103355745 | A | 10/2013 |
| CN | 203435685 | U | 2/2014 |
| CN | 103653260 | A | 3/2014 |
| CN | 203538386 | U | 4/2014 |
| CN | 203563696 | U | 4/2014 |

* cited by examiner

VAPORIZER DEVICE OF COTTON-FREE ELECTRONIC CIGARETTE

FIELD OF THE INVENTION

The present invention relates to a vaporizer device of a cotton-free electronic cigarette.

BACKGROUND OF THE INVENTION

The cotton-free electronic cigarette, or the vaporizer device of the cotton-free electronic cigarette, is prone to leak a liquid. Therefore, it is necessary to provide a structure which allows for smooth flow without liquid leakage.

SUMMARY OF THE INVENTION

The present invention aims to provide a vaporizer device of a cotton-free electronic cigarette, which effectively supports the filter piece and the liquid percolation piece, such that the liquid leakage, which is caused by excess liquid supply due to the tilting or shifting of the filter piece and the liquid percolation piece during the use, is avoid. The present invention also aims to provide a vaporizer device of a cotton-free electronic cigarette, comprising a supporting frame which supports the filter piece and the vaporizer unit, respectively, has thermal insulation property, and has an airflow passage. The present invention also aims to provide a vaporizer device of a cotton-free electronic cigarette, which provides a upper cavity of a supporting frame having a sector-shaped cross section with a central angle being a reflex angle, effectively supporting the filter piece and the liquid percolation piece, such that the liquid leakage, which is caused by redundant liquid due to the tilting or shifting of the filter piece and the liquid percolation piece during the use, is avoid.

The present invention provides a vaporizer device of a cotton-free electronic cigarette, comprising: an outer sleeve, a supporting frame arranged inside of the outer sleeve, a vaporizer unit which is fixed into the supporting frame, a filter piece and a liquid percolation piece which are sequentially connected to one end of the supporting frame, and a fixation seat connected to the other end of the supporting frame, characterized in that: the supporting frame comprises a frame body which matches the inner space of the outer sleeve, a circumferential protrusion radially protruded from the outer circumference wall of the frame body, an annular-shaped inner shoulder which has a central hole and is arranged at a position inside the supporting frame and opposite to the circumferential protrusion, an upper cavity and a lower cavity respectively formed and extended in opposite directions from the annular-shaped inner shoulder, a slot which is axially symmetrically arranged at the side wall of the upper cavity and passes through the inner shoulder, an annular-shaped step protruded at a position of central hole of the inner shoulder, a rectangular notch which is axially arranged at a plane part of the annular-shaped step on the wall of the upper cavity perpendicular to the slot and works with the end opening of the liquid storage cup to form a vaporizing passage opening, and a backflow groove formed between the inner shoulder of the annular-shaped step and the inner wall of the upper cavity;

wherein the supporting frame has thermal insulation property and effectively supports the filter piece and the liquid percolation piece, such that the liquid leakage, which is caused by excess liquid supply due to the tilting or shifting of the filter piece and the liquid percolation piece during the use, is avoid.

Preferably, an annular part is formed at the upper cavity due to the rectangular notch, and the annular part is molded in such a way that the upper cavity has a semicircle-shaped cross section, or has a sector-shaped cross section with a central angle being an inferior angle or a reflex angle as needed.

Preferably, the rectangular notch is molded in such a way that the upper cavity has a cross section of two semicircles by symmetrically removing part of the outer wall of the upper cavity through a circle center of the upper cavity.

Preferably, the supporting frame has a structure comprising three cylinders arranged to be a triangle; or the supporting frame has a triangular prism structure which is filled up and molded on the basis of the three cylinders.

Preferably, the supporting frame is formed from entity components or honeycomb-shaped non-entity components.

Preferably, the filter piece is made of heat resisting ceramic fiber or heat resisting glass fiber.

The technical solutions of the present invention have advantages as follows:

the vaporizer device comprises a liquid percolation piece and a liquid storage cup connected by snap joints, and a supporting frame for supporting a filter piece which has a sector-shaped cross section with a central angle being a reflex angle, increasing the pressed area of the filter piece, preventing liquid leaks due to high negative pressure during smoking, thereby allowing for smooth flow without liquid leakage;

the vaporizer device comprises a backflow groove formed between the inner shoulder of the annular-shaped step of the upper cavity of supporting frame and the inner wall of the upper cavity, thereby effectively preventing overflow of potential residual liquid during operation; and the supporting frame has thermal insulation property.

LIST OF REFERENCE NUMERALS OF MAIN COMPONENTS 1 power supply assembly
2 vaporizer device
21 liquid storage cup
212 bulge
22 liquid percolation piece
23 filter piece
24 supporting frame
241 circumferential protrusion
242 backflow groove
243 annular-shaped inner shoulder
2431 central hole
2432 annular-shaped step
244 upper cavity
2441 slot
2442 rectangular notch
245 lower cavity
25 vaporizer unit
26 fixation seat
261 sleeve
262 separation plate
263 mounting groove
264 sealing ring
3 liquid storage assembly
4 outer sleeve
5 heat insulation sleeve
6 slit

DETAILED DESCRIPTION OF ILLUSTRATED EMBODIMENTS

Various preferred embodiments will now be described with reference to the figures.

FIGS. 1-10 show an embodiment of a vaporizer device of a cotton-free electronic cigarette according to the present invention.

Figure 1:
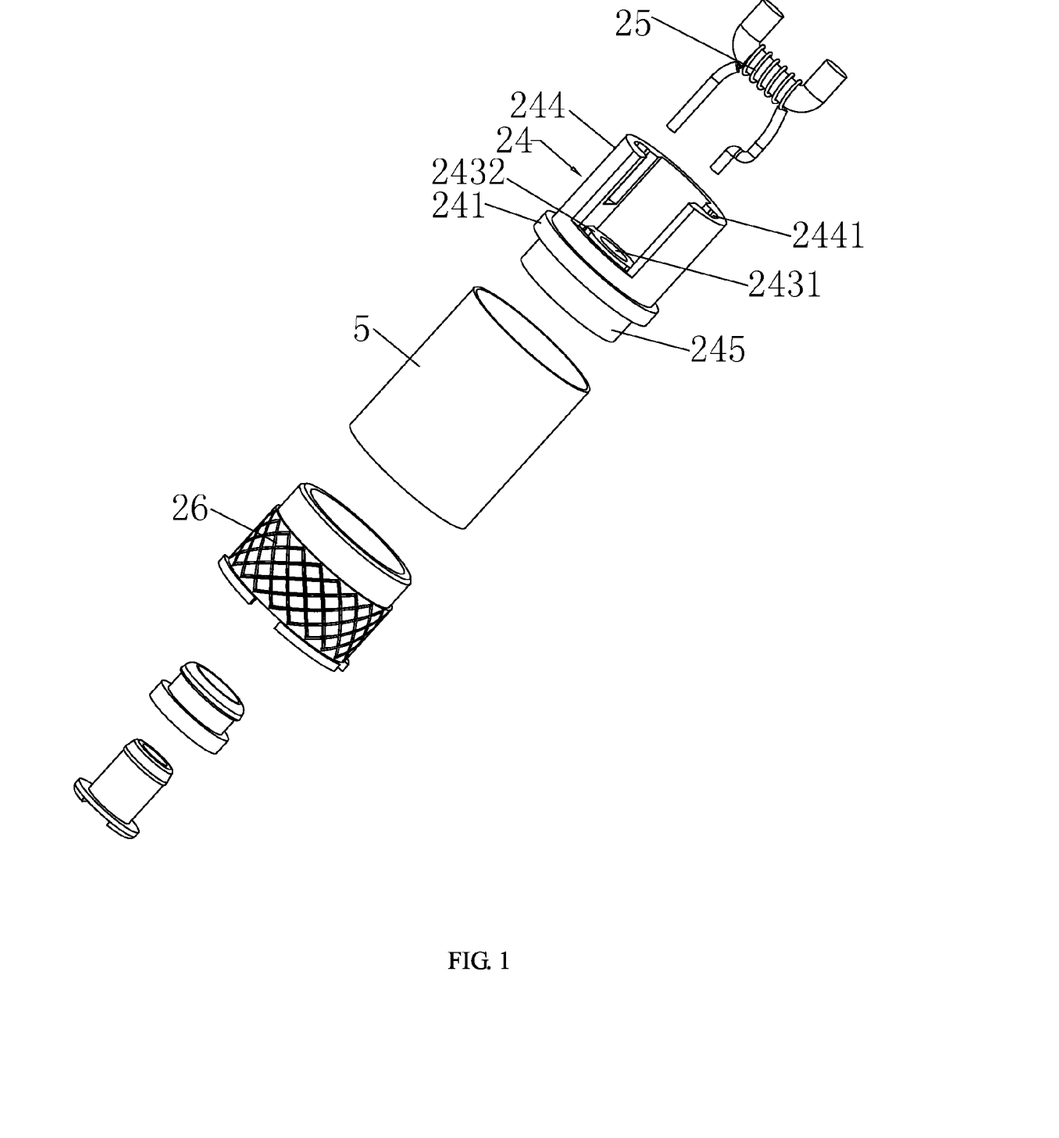
FIG. 1 is a perspective exploded view of a vaporizer unit according to the present invention.
Figure 2:
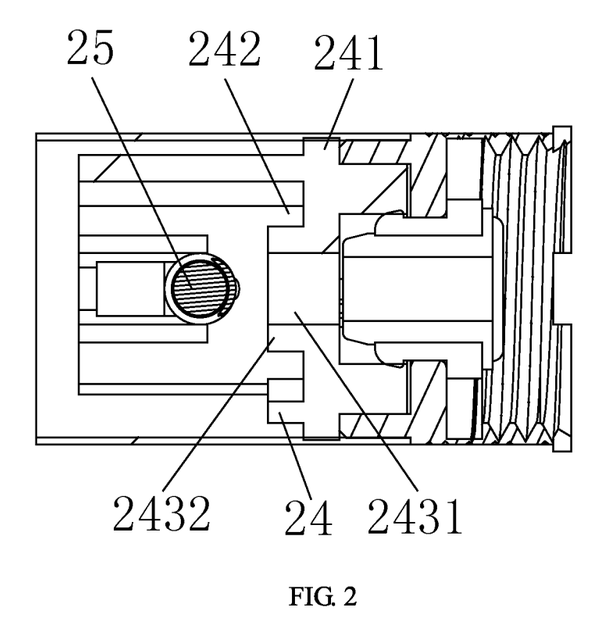
FIG. 2 is a cross-sectional view of the structure shown in FIG. 1.
Figure 3:
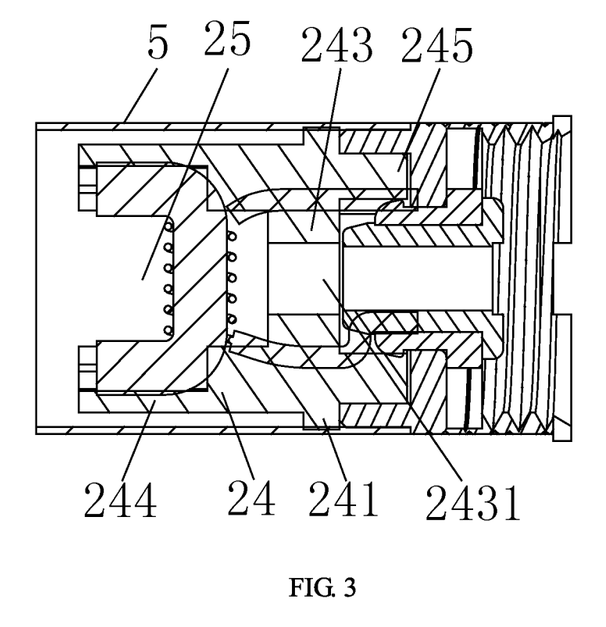
FIG. 3 is another cross-sectional view of the structure shown in FIG. 1.

Referring to FIGS. 1-3, the cotton-free electronic cigarette comprises a power supply assembly (not shown in FIGS. 1-3), a vaporizer device 2 and a liquid storage assembly 3 which are sequentially connected with one another, wherein the power supply assembly and the liquid storage assembly 3 are common knowledge in the art and are thus omitted here.

Figure 8:
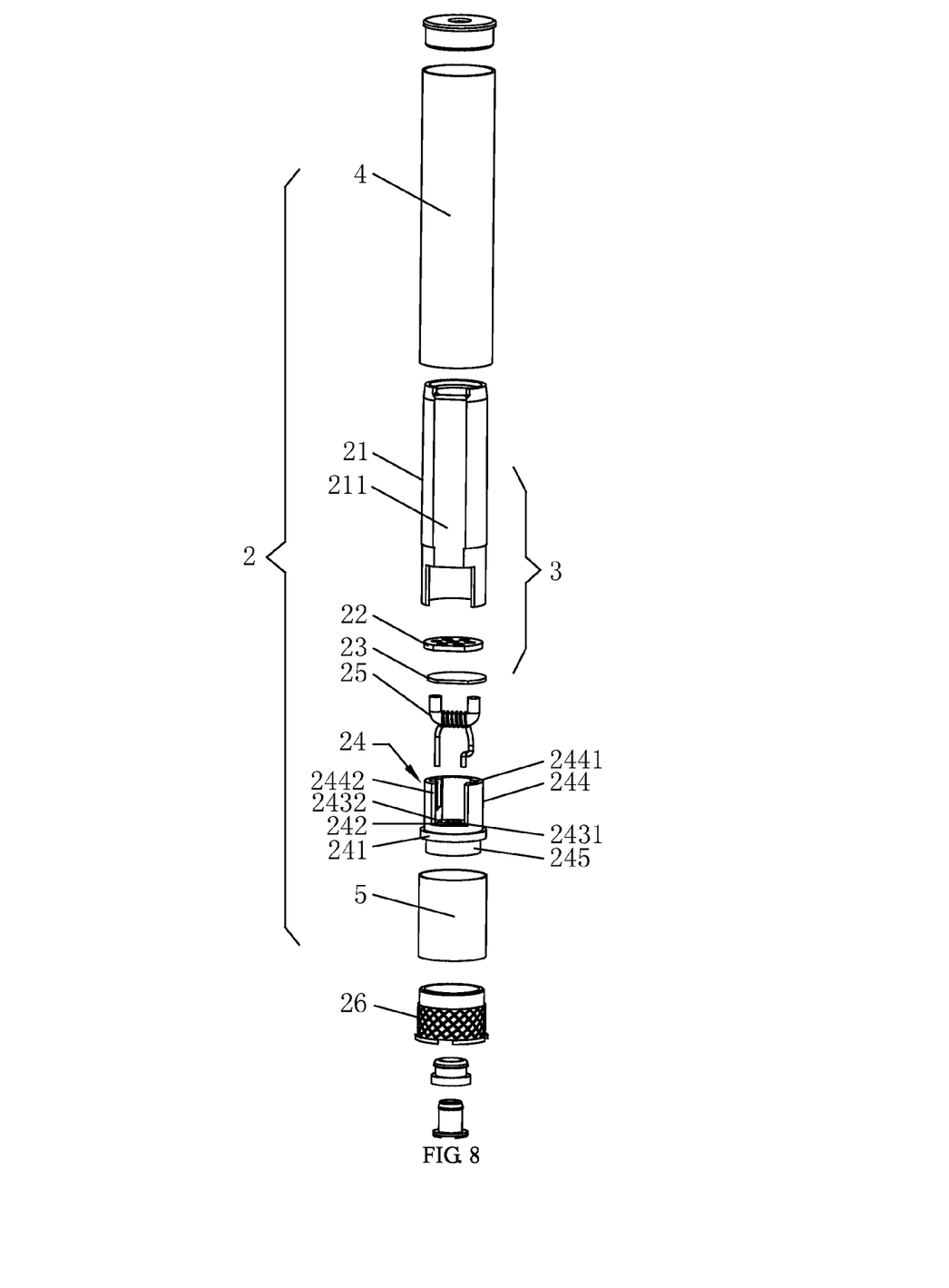
FIG. 8 is a perspective exploded view of a vaporizer of a cotton-free electronic cigarette according to the present invention.
Figure 9:
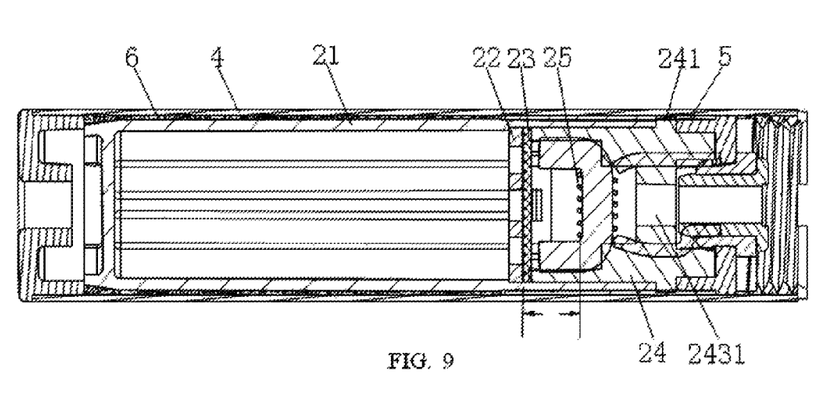
FIG. 9 is a cross-sectional view of the structure shown in FIG. 8.
Figure 10:
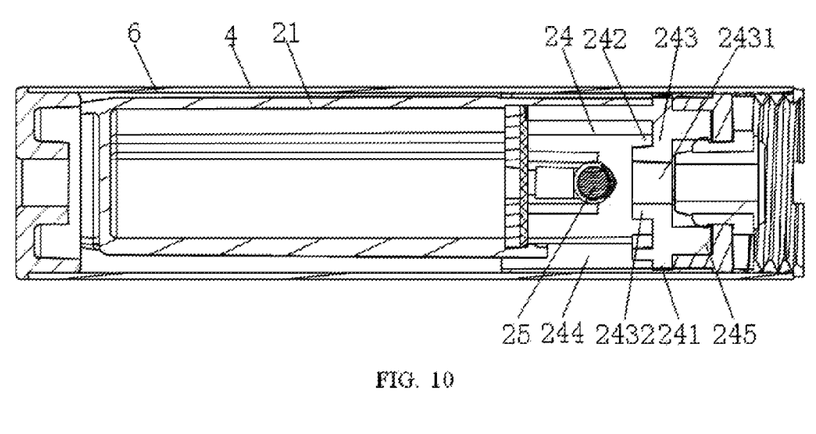
FIG. 10 is another cross-sectional view of the structure shown in FIG. 8.

Referring to FIGS. 8, 9, the vaporizer device of the cotton-free electronic cigarette comprises an outer sleeve 4, a supporting frame 24 arranged inside of the outer sleeve 4, a vaporizer unit 25 which is fixed into the supporting frame 24, a filter piece 23 and a liquid percolation piece 22 which are sequentially connected to one end of the supporting frame 24, and a fixation seat 26 connected to the other end of the supporting frame 24, wherein the filter piece 23 is made of heat resisting ceramic fiber or heat resisting glass fiber, and the another end of the filter piece 23 keeps a safe distance (see the H shown in FIG. 9) away from the vaporizer unit 25 to avoid being burned, and wherein the liquid percolation piece 22 is connected at one end with a liquid storage cup 21 by snap joints. The body of the supporting frame is formed from entity components or honeycomb-shaped non-entity components. A backflow groove 242 is made inside the supporting frame 24 to prevent liquid leakage caused by the backflow of residual liquid during the operation of the vaporizer device. The liquid storage cup 21 and the outer sleeve 4 are assembled or molded to form a slit 6 therebetween, so as to prevent the backflow of residual liquid during the operation of the vaporizer device. A liquid absorbing cordage (not shown in Figures) is also provided, which is made of binder-free glass cord that has a good liquid absorbing effect and does not produce other substances with undesired flavor. The heat insulation sleeve 5 is arranged inside of the outer sleeve 4, outside of the liquid storage cup 21, the circumferential protrusion 241 and the fixation seat 26, starting from the position of the liquid percolation piece 22 of the vaporizer device 2, and terminating at the position of the fixation seat 26. The heat insulation sleeve 5 has a good thermal conductivity and heat-resistant performance.

Figure 6:
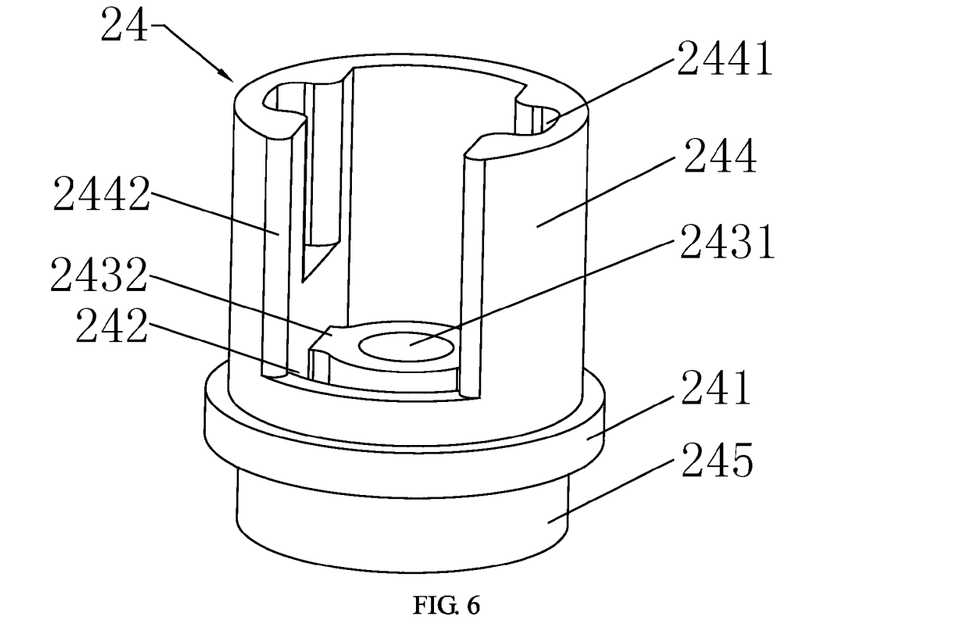
FIG. 6 is a perspective view of a supporting frame according to the present invention.
Figure 7:
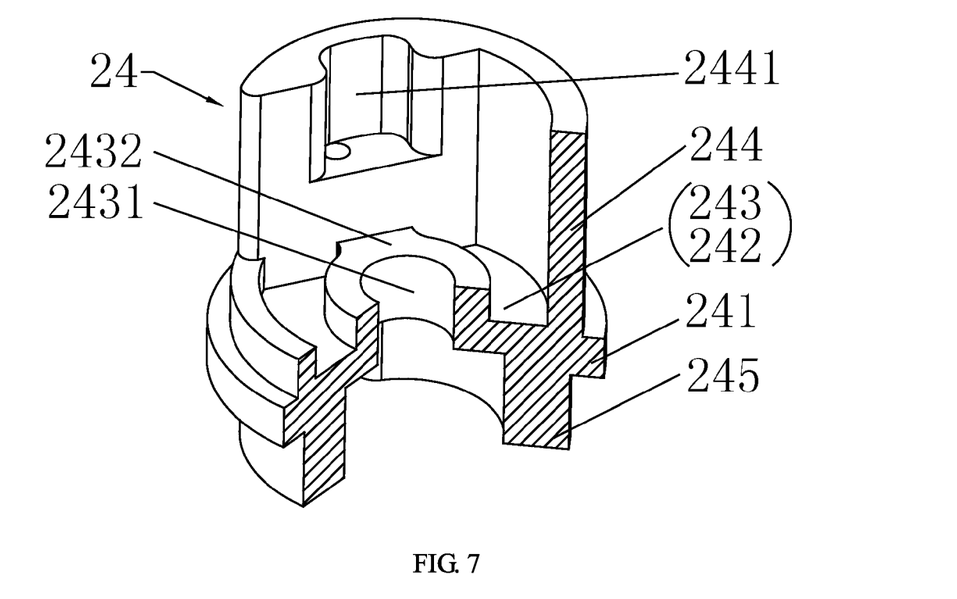
FIG. 7 is a perspective view of a backflow groove of a supporting frame according to the present invention.

Referring to FIGS. 6, 7, the supporting frame 24 comprises:

a frame body which matches the inner space of the outer sleeve 4, a circumferential protrusion 241 radially protruded from the outer circumference wall of the frame body, an annular-shaped inner shoulder 243 which has a central hole 2431 and is arranged at a position inside the supporting frame and opposite to the circumferential protrusion 241, an upper cavity 244 and a lower cavity 245 respectively formed and extended in opposite directions from the annular-shaped inner shoulder 243, a slot 2441 which is axially symmetrically arranged at the side wall of the upper cavity 244 and passes through the inner shoulder 243, an annular-shaped step 2432 protruded at a position of central hole 2431 of the inner shoulder 243, a rectangular notch 2442 axially arranged at a plane part of the annular-shaped step 2432 on the wall of the upper cavity 244 which is perpendicular to the slot 2441, and a backflow groove 242 formed between the inner shoulder 243 of the annular-shaped step 2432 and the inner wall of the upper cavity 244.

In the present embodiment, the rectangular notch 2442 of the upper cavity is formed in such a way that the upper cavity has a sector-shaped cross section with the central angle being a reflex angle (as shown in FIG. 6). The rectangular notch 2442 of the upper cavity may also be molded in other ways as follows:

the rectangular notch 2442 of the upper cavity may be molded in such a way that the upper cavity has a sector-shaped cross section with a central angle being an inferior angle or has a semicircle-shaped cross section; or the rectangular notch 2442 of the upper cavity may be molded by symmetrically removing part of the outer wall of the upper cavity through a circle center of the upper cavity, such that the upper cavity has a cross section of two semicircles (not shown in Figures).

In the present embodiment, the supporting frame 24 may has a structure comprising three cylinders arranged to be a triangle (not shown in Figures); or the supporting frame 24 may has a triangular prism structure (not shown in Figures) filled up and molded on the basis of the three cylinders.

Figure 4:
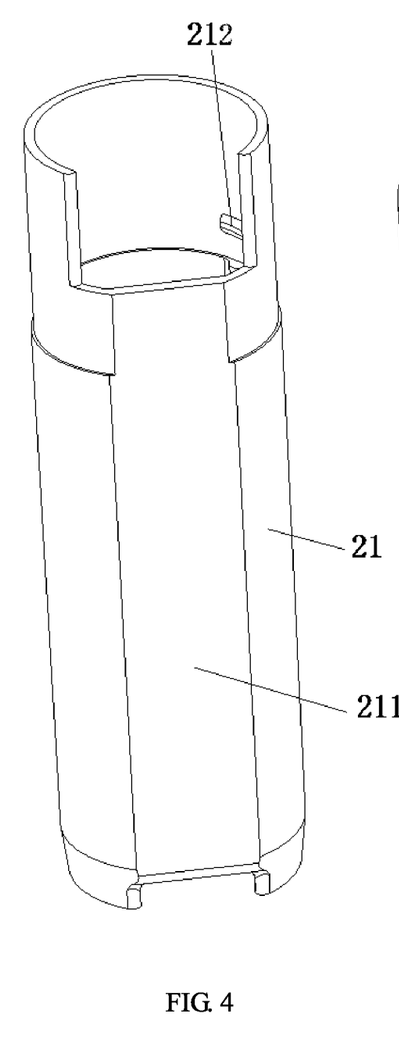
FIG. 4 is a schematic view showing the liquid percolation piece is engaged with the liquid storage cup by snap joints according to the present invention.
Figure 5:
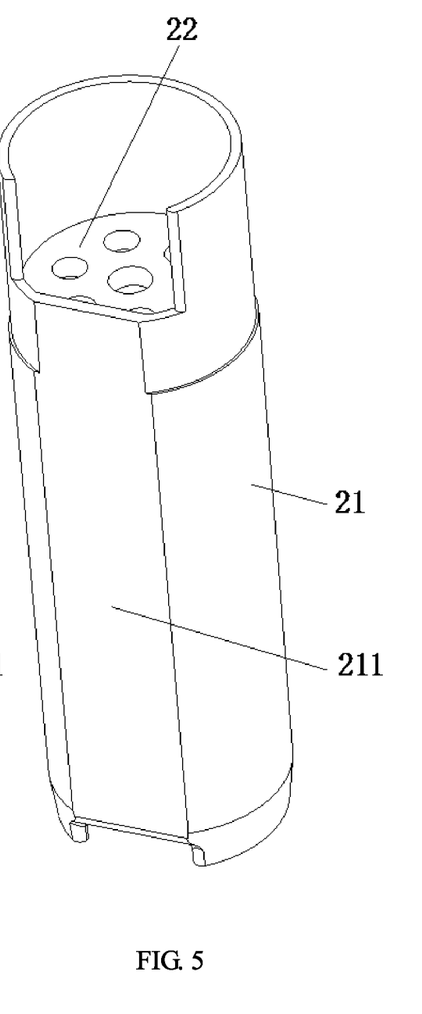
FIG. 5 is a schematic view showing the liquid percolation piece is arranged inside of the liquid storage cup according to the present invention.

Referring to FIG. 4, the liquid percolation piece 22 is engaged with the liquid storage cup 21 by snap joints in any one of the following ways:

a bulge (not shown in Figures) convexly arranged at the liquid percolation piece 22 may embed to a recess (not shown in Figures) concaved at a corresponding position on the liquid storage cup 21;

a recess (not shown in Figures) concaved at the liquid percolation piece 22 may take in a bulge 212 (see FIG. 4) convexly arranged at a corresponding position on the liquid storage cup 21.

Figure 11:
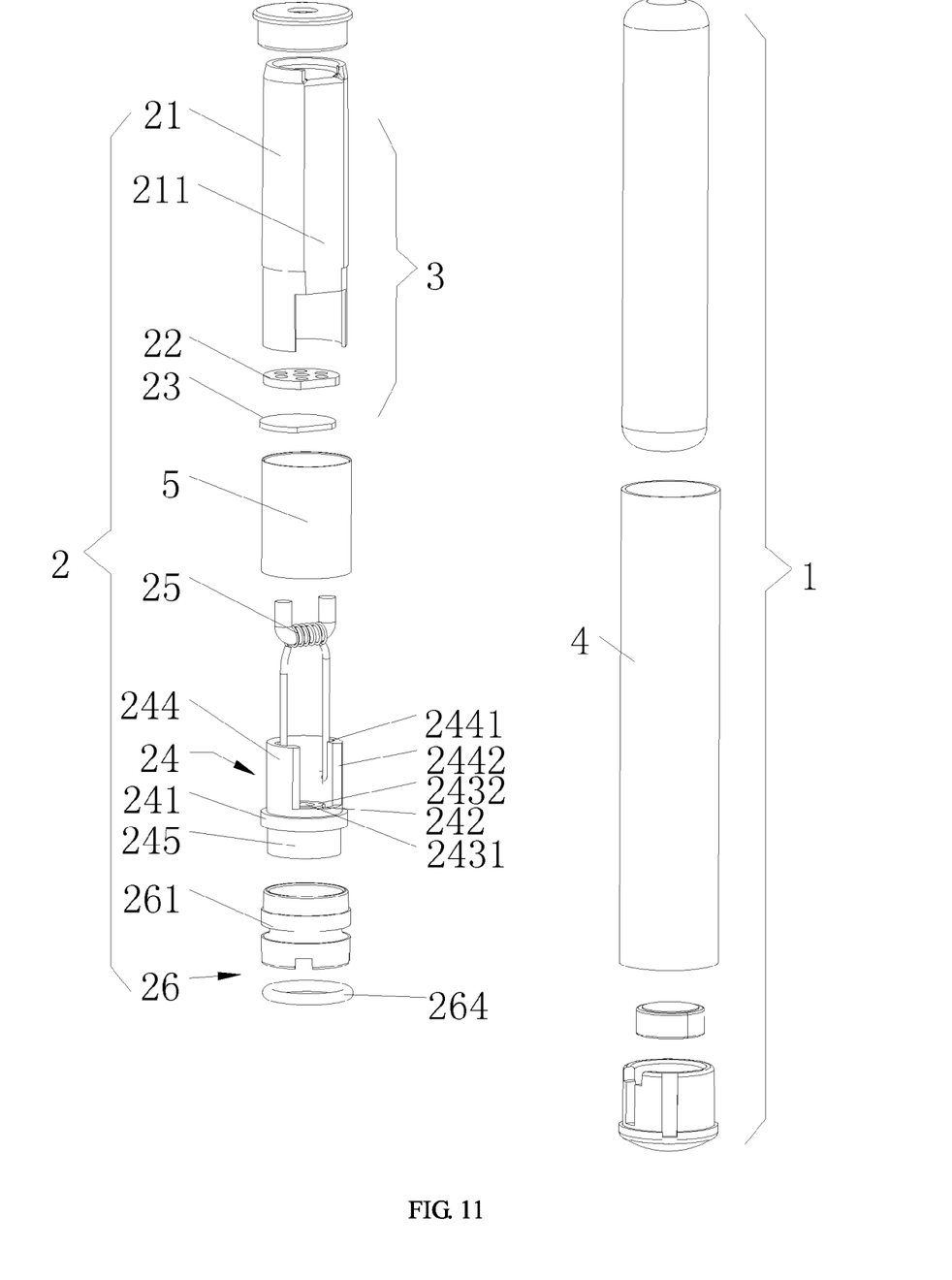
FIG. 11 is a perspective exploded view of a disposable cotton-free electronic cigarette according to the present invention.
Figure 12:
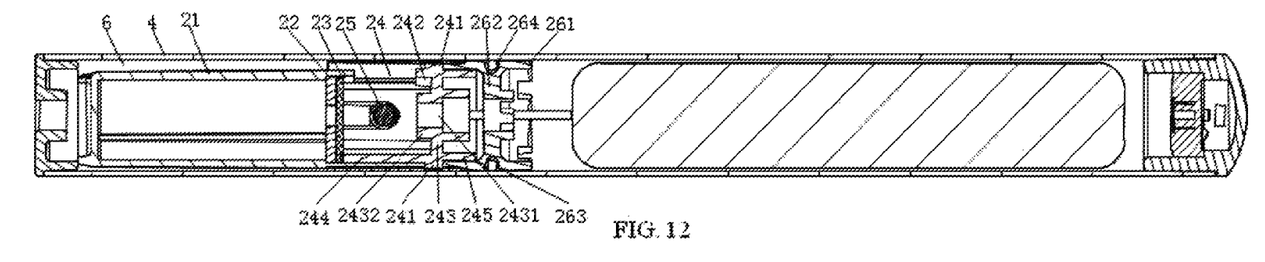
FIG. 12 is a cross-sectional view of the structure shown in FIG. 11.
Figure 13:
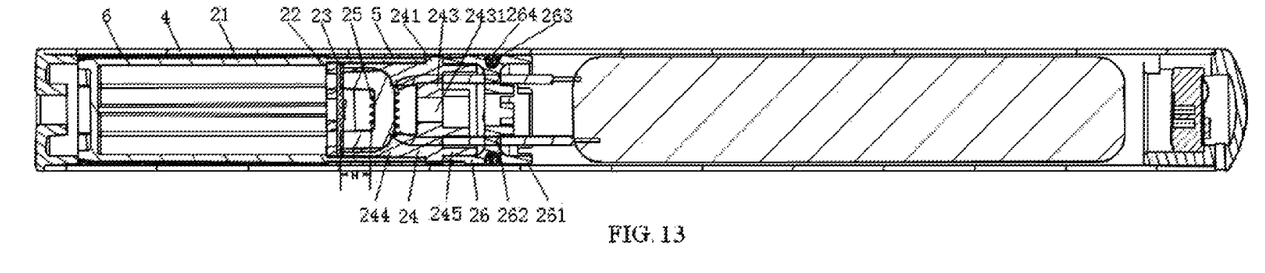
FIG. 13 is another cross-sectional view of the structure shown in FIG. 11.

FIGS. 11-13 show an embodiment of a disposable cotton-free electronic cigarette according to the present invention.

The disposable cotton-free electronic cigarette comprises a power supply assembly 1, a vaporizer device 2 and a liquid storage assembly 3 which are sequentially connected with one another, wherein the power supply assembly 1 and the liquid storage assembly 3 are common knowledge in the art and are thus omitted here.

In the present embodiment, a vaporizer device 2 of a disposable cotton-free electronic cigarette comprises:

a liquid storage cup 21, a liquid percolation piece 22 and a filter piece 23 sequentially fixed into an opening end of the liquid storage cup 21, the filter piece 23 being made of heat resisting ceramic fiber or heat resisting glass fiber, a supporting frame 24, a vaporizer unit 25 symmetrically installed in a longitudinal slot 2441 of the supporting frame, a circumferential protrusion 241 which is arranged on the outer circumference wall of the supporting frame and is mounted to the liquid storage cup 21 and a fixation seat 26 at the two ends, respectively, an outer sleeve 4 which is hollow inside, a liquid storage cup 21, a circumferential protrusion 241 of the supporting frame and a fixation seat 26 sequentially arranged inside of the outer sleeve 4, and a heat insulation sleeve 5 which is arranged inside of the outer sleeve 4, outside of the liquid storage cup 21, the circumferential protrusion 241 and the fixation seat 26, starting from the position of the liquid percolation piece 22 of the vaporizer device, terminating at the position of the fixation seat 26, and having a good thermal conductivity and heat-resistant performance;

the outer sleeve 4, the heat insulation sleeve 5, the liquid storage cup 21, the circumferential protrusion 241 and the fixation seat 26 are coaxially arranged;

wherein the body of the supporting frame is formed from entity components or honeycomb-shaped non-entity components, and a backflow groove 242 is made inside the supporting frame 24 to prevent liquid leakage caused by the backflow of residual liquid during the operation of the vaporizer device;

wherein the another end of the filter piece 23 keeps a safe distance away from the vaporizer unit 25 to avoid being burned, the liquid percolation piece 22 is connected at one end with the liquid storage cup 21 by snap joints, and the liquid storage cup 21 and the outer sleeve 4 are assembled or molded to form a slit 6 therebetween, so as to prevent the backflow of residual liquid during the operation of the vaporizer device;

and a liquid absorbing cordage (not shown in Figures) is also provided, which is made of binder-free glass cord that has a good liquid absorbing effect and does not produce other substances with undesired flavor.

In the present embodiment, the outer circumference wall of liquid storage cup 21 is axially cut such that a section 211 is formed, and thus a passage is formed between the section 211 and the heat insulation sleeve 5.

In the present embodiment, the fixation seat 26 comprises:

a sleeve 261, a separation plate 262 radially arranged in the middle of the sleeve 261, two circular cavities respectively formed inside and outside of the separation plate 262, a through hole which is provided at the center of the separation plate and connects the two circular cavities of the separation plate 262, a mounting groove 263 which is radially concaved on the outer wall of the sleeve 261 at the position of the separation plate 262 and is used for mounting seal ring 264.

In the present embodiment, the supporting frame 24 comprises:

a frame body which matches the inner space of the outer sleeve 4, a circumferential protrusion 241 radially protruded from the outer circumference wall of the frame body, an annular-shaped inner shoulder 243 which has a central hole 2431 and is arranged at a position inside the supporting frame and opposite to the circumferential protrusion 241, an upper cavity 244 and a lower cavity 245 respectively formed and extended in opposite directions from the annular-shaped inner shoulder 243, a slot 2441 which is axially symmetrically arranged at the side wall of the upper cavity 244 and passes through the inner shoulder 243, an annular-shaped step 2432 protruded at a position of central hole 2431 of the inner shoulder 243, a rectangular notch 2442 axially arranged at a plane part of the annular-shaped step 2432 on the wall of the upper cavity 244 which is perpendicular to the slot 2441, and a backflow groove 242 formed between the inner shoulder 243 of the annular-shaped step 2432 and the inner wall of the upper cavity 244.

In the present embodiment, the rectangular notch 2442 of the upper cavity is molded in such a way that the upper cavity has a sector-shaped cross section with a central angle being a reflex angle (as shown in FIG. 11). The rectangular notch 2442 of the upper cavity may also be molded in other way as follows:

the rectangular notch 2442 of the upper cavity may be molded in such a way that the upper cavity has a sector-shaped cross section with a central angle being an inferior angle or has a semicircle-shaped cross section; or the rectangular notch 2442 of the upper cavity may be molded in such a way that the upper cavity has a cross section of two semicircles (not shown in Figures) by symmetrically removing part of the outer wall of the upper cavity through a circle center of the upper cavity.

In the present embodiment, the supporting frame 24 may has a structure comprising three cylinders arranged to be a triangle (not shown in Figures); or the supporting frame 24 may has a triangular prism structure (not shown in Figures) filled up and molded on the basis of the three cylinders. Referring to FIG. 4, a recess (not shown in Figures) is concaved at the liquid percolation piece 22, and the recess takes in a bulge 212 convexly arranged at a corresponding position on the liquid storage cup 21.

All the above are the preferred embodiments of the present invention, and the invention is intended to cover various modifications and equivalent arrangements included within the scope of the invention.

What is claimed is:

1. A vaporizer device of a cotton-free electronic cigarette, comprising:

an outer sleeve, a supporting frame arranged inside of the outer sleeve, a vaporizer unit fixed into the supporting frame,
a filter piece and a liquid percolation piece sequentially connected to one end of the supporting frame, and
a fixation seat connected to the other end of the supporting frame,
the supporting frame comprises:
- a frame body which matches the inner space of the outer sleeve,
- a circumferential protrusion radially protruded from an outer circumference wall of the frame body,
- an annular-shaped inner shoulder which has a central hole and is arranged at a position inside the supporting frame and opposite to the circumferential protrusion,
- an upper cavity and a lower cavity respectively formed and extended in opposite directions from the annular-shaped inner shoulder,
- a slot which is axially symmetrically arranged at the side wall of the upper cavity and passes through the inner shoulder,
- an annular-shaped step protruded at a position of central hole of the inner shoulder,
- a rectangular notch which is axially formed at a plane part of the annular-shaped step on the wall of the upper cavity perpendicular to the slot and works with an end opening of the liquid storage cup to form a vaporizing passage opening, and
- a backflow groove formed between the inner shoulder of the annular-shaped step and the inner wall of the upper cavity;

wherein the supporting frame has thermal insulation property and effectively supports the filter piece and the liquid percolation piece, such that the liquid leakage, which is caused by excess liquid supply due to the tilting or shifting of the filter piece and the liquid percolation piece during the use, is avoid.

2. The vaporizer device of a cotton-free electronic cigarette according to claim 1, characterized in that: the upper cavity forms an annular part due to the rectangular notch, and it is molded in such a way that the upper cavity has a semicircle-shaped cross section, or has a sector-shaped cross section with a central angle being an inferior angle or a reflex angle as needed.

3. The vaporizer device of a cotton-free electronic cigarette according to claim 1, characterized in that: the upper cavity is molded in such a way it has a cross section of two semicircles due to the rectangular notch formed by symmetrically removing part of outer wall through a circle center of the upper cavity.

4. The vaporizer device of a cotton-free electronic cigarette according to claim 1, characterized in that: the supporting frame has a structure comprising three cylinders arranged to be a triangle; or the supporting frame has a triangular prism structure which is filled up and molded on the basis of the three cylinders.

5. The vaporizer device of a cotton-free electronic cigarette according to claim 1, characterized in that: the supporting frame is formed from entity components or honeycomb-shaped non-entity components.

6. The vaporizer device of a cotton-free electronic cigarette according to claim 1, characterized in that: the filter piece is made of heat resisting ceramic fiber or heat resisting glass fiber.

* * * * *